(12) United States Patent
Lyell et al.

(10) Patent No.: US 11,844,454 B1
(45) Date of Patent: Dec. 19, 2023

(54) MICRO PUREE MACHINE WITH BOWL AND BLADE DETECTION

(71) Applicant: SharkNinja Operating LLC, Needham, MA (US)

(72) Inventors: Nathan Lyell, Surrey (GB); Jonathan James, Witney (GB)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 17/992,308

(22) Filed: Nov. 22, 2022

Related U.S. Application Data (63) Continuation of application No. 17/956,917, filed on Sep. 30, 2022.

(51) Int. Cl.
| | |
|---|---|
| *A47J 43/07* | (2006.01) |
| *A47J 43/044* | (2006.01) |
| *A23G 9/12* | (2006.01) |
| *A23G 9/22* | (2006.01) |

(52) U.S. Cl.
CPC ............ *A47J 43/0755* (2013.01); *A23G 9/12* (2013.01); *A23G 9/228* (2013.01); *A47J 43/044* (2013.01); *A47J 43/0711* (2013.01); *A47J 2043/0449* (2013.01)

(58) Field of Classification Search
CPC .................................................. A47J 43/0755
USPC ....................................................... 241/37.5
See application file for complete search history.

(56) References Cited

U.S. PATENT DOCUMENTS

| | | |
|---|---|---|
| 2,815,194 A | 12/1957 | Seyfried |
| 2,829,872 A | 4/1958 | MacDougall |
| 3,630,493 A | 12/1971 | Carpigiani |
| 4,693,611 A | 9/1987 | Verkler |
| 4,705,055 A | 11/1987 | Rohm et al. |
| 4,828,398 A | 5/1989 | Verkler |
| 5,215,222 A | 6/1993 | McGill |
| 5,415,534 A | 5/1995 | Bertrand et al. |
| 5,803,377 A | 9/1998 | Farrell |
| 6,250,794 B1 | 6/2001 | Huang |
| 6,824,303 B2 | 11/2004 | Huang |
| 7,028,607 B2 | 4/2006 | Zweben |
| 7,264,160 B2 | 9/2007 | Polarine et al. |
| 7,451,613 B2 | 11/2008 | Barraclough et al. |
| 7,993,053 B2 | 8/2011 | McGill |
| 9,351,504 B2 | 5/2016 | Ricco et al. |

(Continued)

FOREIGN PATENT DOCUMENTS

| | | |
|---|---|---|
| CN | 201345883 Y | 11/2009 |
| CN | 102805194 | 2/2012 |

(Continued)

OTHER PUBLICATIONS

International Search Report and Written Opinion in Application No. PCT/CN2022/123017 dated Mar. 23, 2023, 12 pages.

(Continued)

*Primary Examiner* — David L Sorkin (74) *Attorney, Agent, or Firm* — Burns & Levinson LLP; Joseph M. Maraia; Marlo Schepper Grolnic (57) ABSTRACT

A micro puree machine has a microswitch for interacting with projections on a bowl to alert the user that the bowl has been installed correctly to the machine housing. The microswitch also interacts with a plunger of a lid and blade assembly to alert the user that the blade has been properly assembled to the lid.

20 Claims, 9 Drawing Sheets

(56) References Cited

U.S. PATENT DOCUMENTS

| | | |
|---|---|---|
| 9,565,868 B2 | 2/2017 | D'Agostino |
| 9,968,222 B2 | 5/2018 | Audette |
| 9,993,015 B2 | 6/2018 | Geng et al. |
| 10,159,262 B2 | 12/2018 | Dong et al. |
| 10,595,544 B2 | 3/2020 | Beth Halachmi |
| 10,660,348 B2 | 5/2020 | Cheung |
| 10,786,119 B2 | 9/2020 | Cheung et al. |
| 10,794,624 B2 | 10/2020 | Rupp |
| 10,801,769 B2 | 10/2020 | Rupp |
| 10,995,976 B2 | 5/2021 | Rupp |
| 11,002,473 B2 | 5/2021 | Rupp |
| 11,083,320 B2 | 8/2021 | Zhao et al. |
| 11,154,075 B2 | 10/2021 | Ricco et al. |
| 11,154,163 B1 | 10/2021 | He et al. |
| 11,279,609 B2 | 3/2022 | Fonte et al. |
| 11,324,358 B1 | 5/2022 | O'Loughlin et al. |
| 11,337,439 B2 | 5/2022 | Fonte et al. |
| 11,439,158 B2 | 9/2022 | Farina |
| 11,470,855 B2 | 10/2022 | Fonte et al. |
| 11,583,144 B1 | 2/2023 | Williams et al. |
| 2003/0000240 A1 | 1/2003 | Pahl |
| 2004/0081733 A1 | 4/2004 | Buter et al. |
| 2004/0161503 A1 | 8/2004 | Malone et al. |
| 2005/0047272 A1 | 3/2005 | Sands |
| 2005/0170054 A1 | 8/2005 | Czark et al. |
| 2005/0172826 A1 | 8/2005 | Kim |
| 2005/0173462 A1 | 8/2005 | Stumler et al. |
| 2006/0255066 A1 | 11/2006 | Kannar et al. |
| 2007/0241140 A1 | 10/2007 | Cocchi |
| 2012/0027902 A1 | 2/2012 | Audette et al. |
| 2012/0048977 A1 | 3/2012 | Machovina et al. |
| 2012/0096876 A1 | 4/2012 | Ravji et al. |
| 2014/0203127 A1* | 7/2014 | Merl .................. A47J 43/0711 241/285.2 |
| 2015/0201808 A1 | 7/2015 | Katsuki et al. |
| 2015/0216360 A1* | 8/2015 | Hosner .............. A47J 43/0766 241/37.5 |
| 2020/0260755 A1 | 8/2020 | Harrison et al. |
| 2021/0055027 A1 | 2/2021 | Rupp |
| 2021/0068419 A1 | 3/2021 | Spirk et al. |
| 2021/0106508 A1 | 4/2021 | Akridge et al. |
| 2021/0120841 A1 | 4/2021 | Kiser et al. |
| 2021/0204564 A1 | 7/2021 | Bellomare et al. |
| 2021/0227848 A1 | 7/2021 | Yang et al. |
| 2021/0371265 A1 | 12/2021 | Fonte et al. |
| 2022/0202247 A1 | 6/2022 | He et al. |
| 2022/0202248 A1 | 6/2022 | D'Loughlin et al. |
| 2022/0202249 A1 | 6/2022 | He et al. |
| 2022/0202254 A1 | 6/2022 | O'Loughlin |
| 2022/0225636 A1 | 7/2022 | Minard et al. |
| 2022/0225831 A1 | 7/2022 | He et al. |
| 2023/0010316 A1 | 1/2023 | White et al. |

FOREIGN PATENT DOCUMENTS

| | | |
|---|---|---|
| CN | 103168908 A | 6/2013 |
| CN | 103181715 A | 7/2013 |
| CN | 203088680 U | 7/2013 |
| CN | 203152409 U | 8/2013 |
| CN | 203233980 U | 10/2013 |
| CN | 204362865 | 6/2015 |
| CN | 110168296 A | 8/2019 |
| CN | 210642278 U | 6/2020 |
| CN | 112042801 A | 12/2020 |
| CN | 112469283 A | 3/2021 |
| CN | 112512393 A | 3/2021 |
| CN | 105828630 B | 5/2021 |
| CN | 216282190 U | 4/2022 |
| EP | 0314209 | 5/1989 |
| EP | 0891139 | 1/1999 |
| EP | 0995685 | 4/2000 |
| EP | 0891139 B1 | 5/2002 |
| EP | 1495682 | 1/2005 |
| EP | 1689250 A2 | 8/2006 |
| EP | 2380474 A2 | 10/2011 |
| EP | 3060069 B1 | 8/2016 |
| EP | 3535532 A1 | 9/2019 |
| EP | 3616528 | 3/2020 |
| EP | 3755160 B1 | 12/2020 |
| EP | 3801042 A1 | 4/2021 |
| ES | 1071424 U | 2/2010 |
| FR | 2585588 A1 | 2/1987 |
| JP | H01-11029 Y2 | 3/1989 |
| WO | 2005070271 | 8/2005 |
| WO | 2019117804 | 6/2019 |
| WO | 2019146834 | 8/2019 |
| WO | 2019224859 A1 | 11/2019 |
| WO | 2022020653 A1 | 1/2022 |

OTHER PUBLICATIONS

International Search Report and Written Opinion in Application No. PCT/US2022/053650 dated Jul. 3, 2023, 13 pages.

International Search Report and Written Opinion in Application No. PCT/CN2022/123016 dated Mar. 31, 2023, 11 pages.

* cited by examiner

MICRO PUREE MACHINE WITH BOWL AND BLADE DETECTION

CROSS-REFERENCE TO RELATED APPLICATIONS

This application is a continuation of U.S. application Ser. No. 17/956,917, filed on Sep. 30, 2022, entitled MICRO PUREE MACHINE WITH BOWL AND BLADE DETECTION, the entire contents of which are incorporated herein by reference for all purposes.

FIELD OF THE INVENTION

The present disclosure relates to a food processing device and, more particularly, to a micro puree machine for making frozen foods and drinks.

BACKGROUND

Home use machines that are intended to make ice creams, gelatos, frozen yogurts, sorbets and the like are known in the art. Typically, a user adds a series of non-frozen ingredients to a bowl. The ingredients are then churned by a paddle while a refrigeration mechanism simultaneously freezes the ingredients. These devices have known shortcomings including, but not limited to, the amount of time and effort required by the user to complete the ice cream making process. Machines of this nature are impractical for preparing most non-dessert food products.

An alternative type of machine known to make a frozen food product is a micro-puree machine. Typically, machines of this nature spin and plunge a blade into a pre-frozen ingredient or combination of ingredients. While able to make frozen desserts like ice creams, gelatos, frozen yogurts, sorbets and the like, micro puree style machines can also prepare non-dessert types of foods such as non-dessert purees and mousses. In addition, consumers can prepare either an entire batch of ingredients or a pre-desired number of servings. With some current micro puree machines, however, it is difficult for the user to discern when the bowl has been correctly installed to the machine housing, or when the blade has been properly assembled to the lid.

SUMMARY

This disclosure describes a micro puree machine having a microswitch for interacting with projections on the bowl to alert the user that the bowl has been installed correctly to the machine housing. Furthermore, the microswitch interacts with a plunger of a lid and blade assembly to alert the user that the blade has been properly assembled to the lid.

Embodiments of the micro puree machine of this disclosure may include one or more of the following, in any suitable combination.

In one aspect, a lid and blade assembly for a micro puree machine includes a lid having a slotted member defining one or more slots. The lid also includes a cam member positioned between the slotted member and an attachment portion, where the cam member defines at least one pocket. The cam member may be rotatable relative to the slotted member between a first position and a second position. The lid further includes plunger having a first portion and a second portion, where the second portion of the plunger is configured to extend through one of the one or more slots and rest in the at least one pocket when the cam member is in the first position. The assembly also includes a blade insertable within the lid when the cam member is in the second position such that, when the cam member is in the second position, the second portion of the plunger is configured to exit the pocket to cause the first portion to activate a microswitch.

The second portion of the plunger may rest on a surface of the cam member when the cam member is in the second position. The attachment portion may be configured to couple to a bowl. Activation of the microswitch may indicate the presence of the blade within the lid to a user. The cam member may include a lever arm for effecting manual rotation of the cam member between the first position and the second position. The slotted member may include a projection for engaging the lever arm when the cam member is in the second position.

The lid may include at least one retaining component for engaging a portion of the blade when the blade is installed in the lid. The lid may be configured to couple to a coupling of the micro puree machine.

In another aspect, a micro puree machine with a lid and blade assembly includes a lid having a slotted member defining one or more slots and an attachment portion configured to couple to a bowl. The lid also includes a cam member positioned between the slotted member and the attachment portion, where the cam member defines at least one pocket. The cam member may be rotatable relative to the slotted member between a first position and a second position. The lid also includes a plunger having a first portion and a second portion, the second portion of the plunger configured to extend through one of the one or more slots and rest in the at least one pocket when the cam member is in the first position. The assembly includes a blade insertable within the lid when the cam member is in the second position. When the cam member is in the second position, the second portion of the plunger is configured to exit the pocket to cause the first portion to activate a microswitch. The lid and the bowl are configured to couple to a coupling of the micro puree machine.

The second portion of the plunger may rest on a surface of the cam member when the cam member is in the second position. Activation of the microswitch may indicate the presence of the blade within the lid to a user. The cam member may include a lever arm for effecting manual rotation of the cam member between the first position and the second position. The slotted member may include a projection for engaging the lever arm when the cam member is in the second position. The lid may include at least one retaining component for engaging a portion of the blade when the blade is installed in the lid. The slotted member may define at least one track for engaging at least one pin on the at least one retaining component.

The second portion of the plunger may extend through an opening in the coupling. The coupling may include at least one rib for engaging the lever arm when the cam member is in the second position. An outer surface of the bowl may include at least one projection for engaging a corresponding indentation on an inner surface of the coupling. The indentation may house an interlock plunger, and wherein engagement of the at least one projection with the interlock plunger causes the interlock plunger to activate the microswitch. Activation of the microswitch may indicate installation of the bowl on the coupling to a user.

A reading of the following detailed description and a review of the associated drawings will make apparent the advantages of these and other structures. Both the foregoing general description and the following detailed description serve as an explanation only and do not restrict aspects of the disclosure as claimed.

BRIEF DESCRIPTION OF THE DRAWINGS

Reference to the detailed description, combined with the following figures, will make the disclosure more fully understood, wherein.

DETAILED DESCRIPTION

In the following description, like components have the same reference numerals, regardless of different illustrated embodiments. To illustrate embodiments clearly and concisely, the drawings may not necessarily reflect appropriate scale and may have certain structures shown in somewhat schematic form. The disclosure may describe and/or illustrate structures in one embodiment, and in the same way or in a similar way in one or more other embodiments, and/or combined with or instead of the structures of the other embodiments.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "top," "bottom," "above," "below" and the like helps only in the clear description of the disclosure and does not limit the structure, positioning and/or operation of the micro puree machine in any manner.

Figure 1:
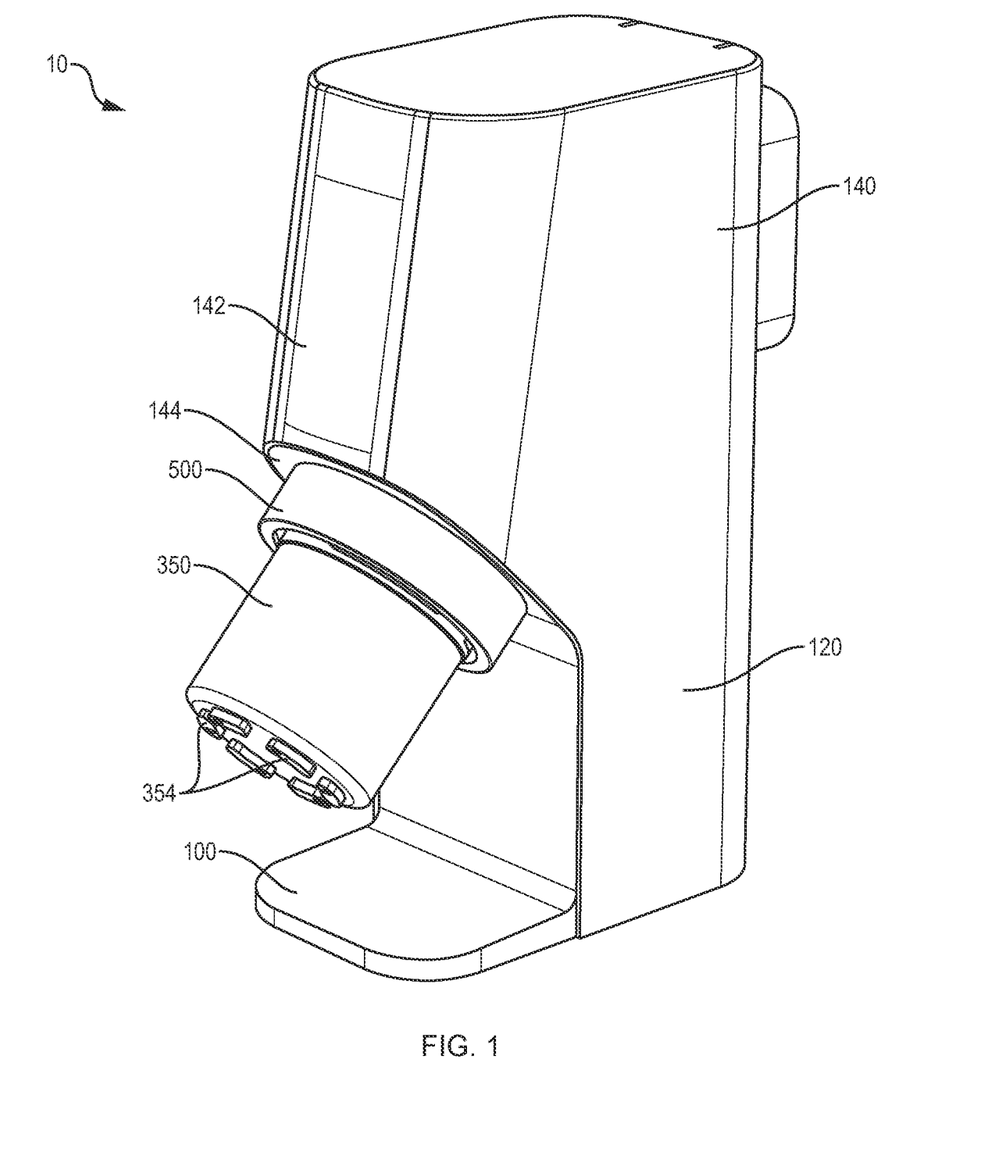
FIGS. 1 and 2 show a micro puree machine according to some embodiments of this disclosure.
Figure 2:
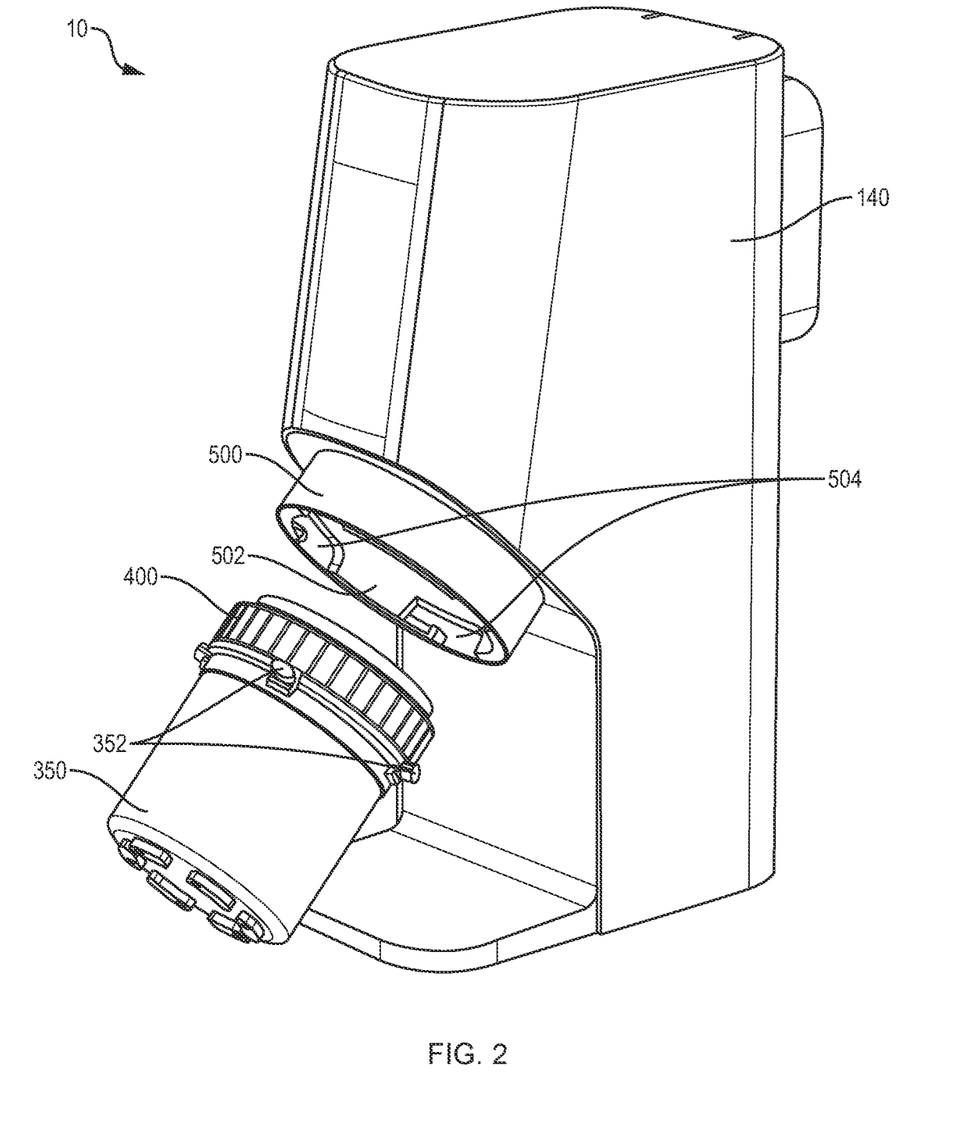

FIG. 1 shows an isometric view of a micro puree machine 10 according to an illustrative embodiment of the present disclosure. The micro puree machine 10 may include a base 100 and an upper housing 140. A middle housing 120 may extend between the base 100 and the upper housing 140. The upper housing 140 may include an interface 142 for receiving user inputs to control the micro puree machine 10 and/or display information. The micro puree machine 10 may also include a removable bowl 350 and lid 400 (FIG. 2). The bowl 350 may contain one or more pre-frozen ingredients for processing. A user may couple the bowl 350 to a coupling 500 on a surface 144 of the upper housing 140 by rotating the bowl 350 relative to the coupling 500, as further described below. In embodiments, the bowl 350 may include features 354 on the bottom surface of the bowl 350 to aid in the fixing of frozen ingredients within the bowl 350. The features 354 may prevent such ingredients from rotational movement within the bowl 350 during use. In embodiments, the bowl 350 can be manufactured from a disposable material to enhance the convenience of using the micro puree machine 10. Further, the bowl 350 can be sold as a stand-alone item and can also be prefilled with ingredients to be processed during use of the micro puree machine 10.

FIG. 2 shows the micro puree machine 10 of FIG. 1 with the bowl 350 and the lid 400 disassembled from the upper housing 140 according to some embodiments. As shown in FIG. 2, an inner surface 502 of the coupling 500 may comprise locating and locking elements for positioning and connecting the bowl 350 to the coupling 500. For example, the inner surface 502 of the coupling 500 may comprise one or more indentations 504 sized to receive at least one corresponding projection 352 on an outer surface of the bowl 350. In embodiments, the at least one projection 352 may be four projections 352 spaced 90 degrees apart about an outer surface of the bowl 350. However, the disclosure contemplates more or fewer than four projections 352. The user may rotate the bowl 350 relative to the coupling 500 such that the projections 352 are rotated into the indentations 504, locking the bowl 350 and the coupling 500 together.

Figure 3:
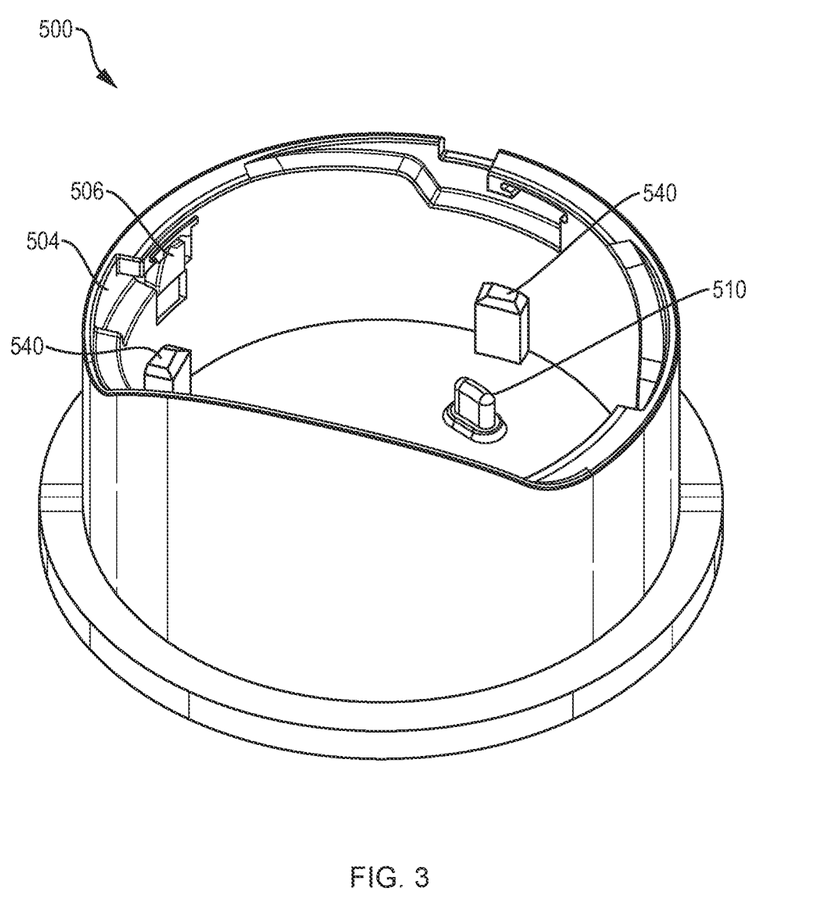
FIG. 3 illustrates a detailed view of the coupling of FIGS. 1 and 2 according to some embodiments.

FIG. 3 illustrates a detailed view of the underside of the coupling 500 according to some embodiments. As shown in FIG. 3, the coupling 500 may include at least one of rib 540 for interacting with the lid 400, as further described below. In embodiments, the at least one rib 540 may be four ribs 540 spaced 90 degrees apart about an inner surface of the coupling 500. However, the disclosure contemplates more or fewer than four ribs 540. In embodiments, when the bowl 350 and the lid 400 are properly installed on the coupling 500, any one of the projections 352 on the bowl 350 may press an interlock plunger 506 within the indentation 504 of the coupling 500. Pressing the interlock plunger 506 may activate a micro switch 434 (FIG. 4A) to alert the user via the interface 142 that the bowl 350 and the lid 400 are properly installed to the coupling 500. Similarly, when a blade has been properly assembled to the lid 400, a blade detection plunger 510 extending through an opening in the coupling 500 may activate the micro switch 434 to alert the user via the interface 142 that the blade has been properly assembled to the lid 400, as further described below.

Figure 4A:
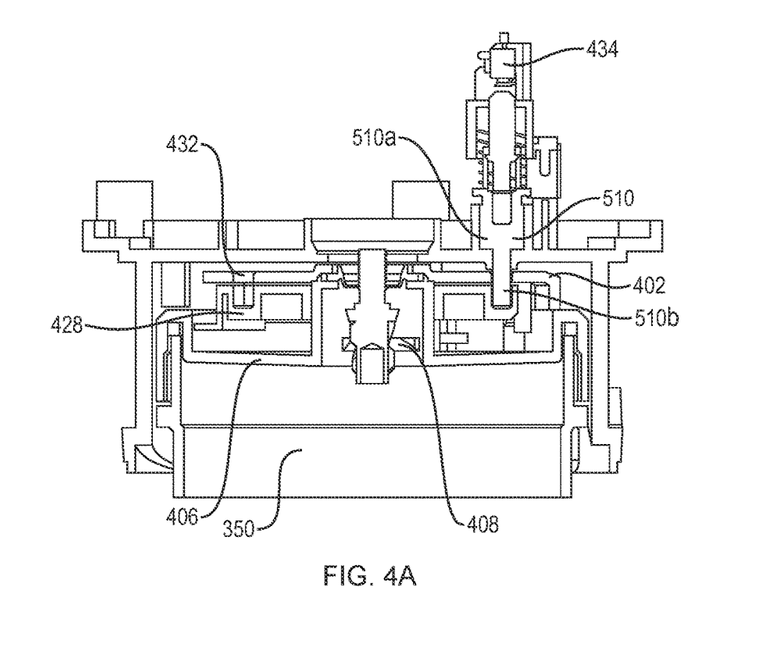
FIGS. 4A-C illustrate the positioning of the blade detection plunger of FIG. 3 when the blade is not installed within the lid, according to some embodiments.
Figure 4B:
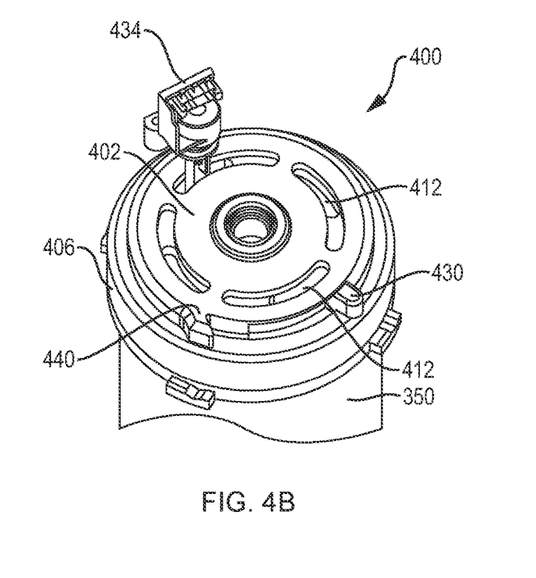
Figure 4C:
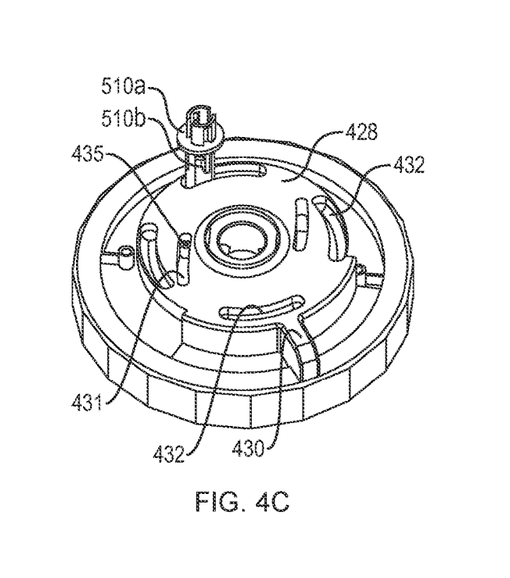

FIGS. 4A-C illustrate the positioning of the blade detection plunger 510 when the blade 300 is not installed within the lid 400 according to some embodiments. As shown in FIGS. 4A-C, embodiments of the lid 400 may include retaining components 408 configured to engage the blade 300 when the blade is installed in the lid. The retaining components 408 may be spring biased toward a center of the lid 400 by at least one spring (not shown). The spring may extend and attach to opposing retaining components 408 such that the spring tends to pull the opposing retaining components 408 toward each other. The lid 400 may further include a slotted member 402 defining one or more slots and/or channels 412 and an attachment portion 406 configured to couple to the bowl 350. Between the slotted member 402 and the attachment portion 406, a cam member 428 may define at least one pocket 432. A release lever arm 430 of the cam member 428 may be retained on the attachment portion 406 such that the release lever arm 430 can move rotationally relative to the slotted member 402 within a pre-determined range of motion. The cam member 428 may also define tracks 431 for engagement with pins 435 on the retaining components 408. The slotted member 402 may also include a projection 440 for engaging the release lever arm 430 as it rotates. In embodiments, the blade detection plunger 510 may have first portion 510a operationally configured to engage the micro switch 434 and a second portion 510b configured to extend through one of the slots 412 and to rest in the pocket 432 of the cam member 428 when the blade 300 is not installed in the lid 400.

Figure 4D:
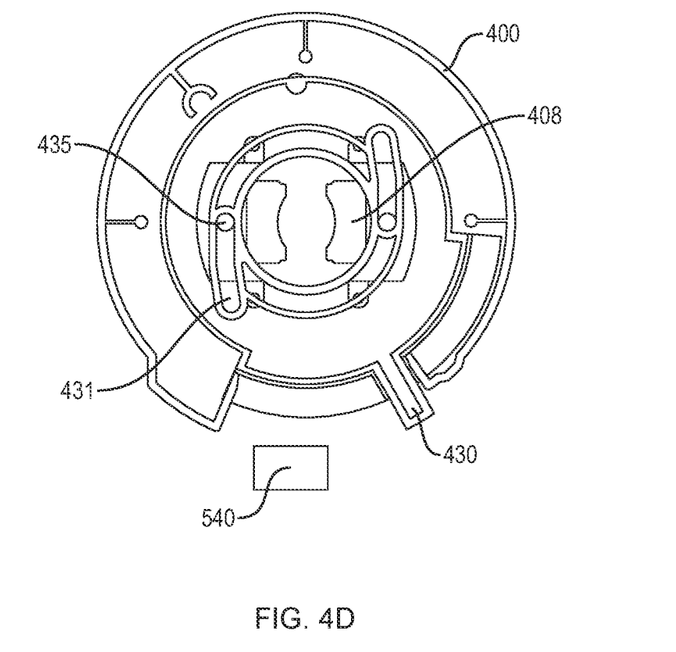
FIGS. 4D and 4E illustrate the relative positioning of the retaining components of FIGS. 4A-C when the blade is not installed in the lid (FIG. 4D) and when the blade is installed in the lid (FIG. 4E), according to some embodiments.
Figure 4E:
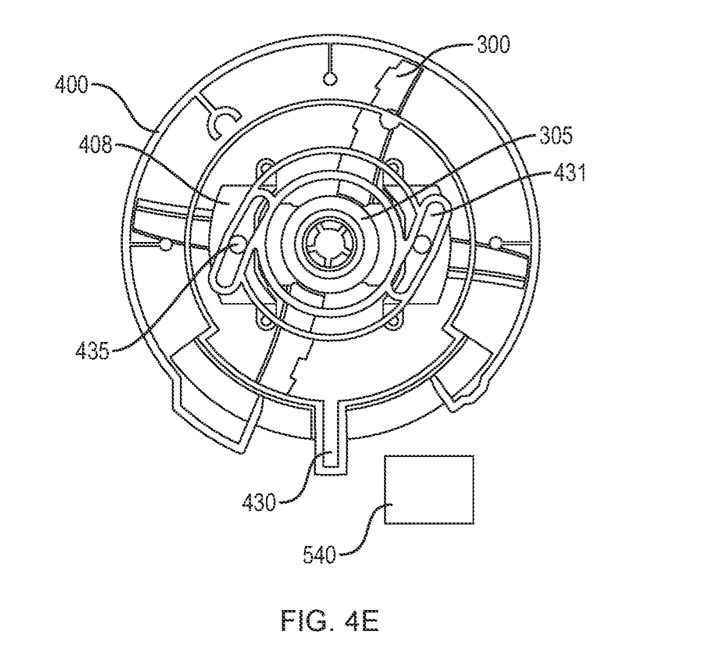

FIGS. 4D and 4E illustrate the relative positioning of the retaining components 408, the pins 435 and the release lever arm 430 when the blade 300 is not installed in the lid 400 (FIG. 4D) and when the blade 300 is installed in the lid 400 (FIG. 4E), according to some embodiments. As shown in FIG. 4D, when the blade 300 is not installed in the lid 400, the pins 435 on the retaining components 408 may sit at the furthest end of the tracks 431. If the lid 400 is installed to the coupling 500 without the blade 300, the release lever arm 430 may sit counterclockwise of a rib 540 of the coupling 500 (FIG. 3). As shown in FIG. 4E, when the blade 300 is installed in the lid 400, the pins 435 on the retaining components 408 may sit further apart from each other and closer to a middle of the tracks 431. If the lid 400 is installed to the coupling 500 with the blade 300, the release lever arm 430 may sit clockwise of the rib 540 of the coupling 500. When the user presses the blade 300 into the lid 400, a central support hub 305 of the blade 300 may tend to urge the retaining components 408 outwards against the force of the springs (not shown). When the user removes the blade 300 from the lid 400, the retaining components 408 may be urged by the springs back to their rest position of FIG. 4D.

Figure 4F:
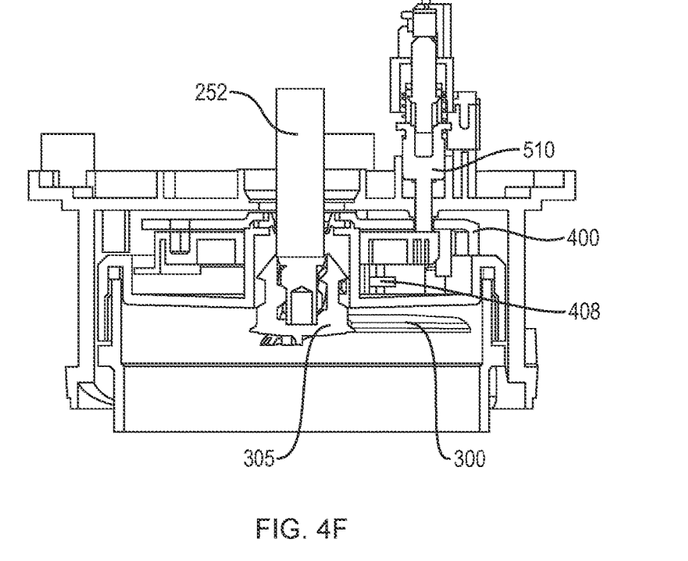
FIGS. 4F-H illustrate the positioning of the blade detection plunger of FIG. 3 when the blade is installed within the lid, according to some embodiments.
Figure 4G:
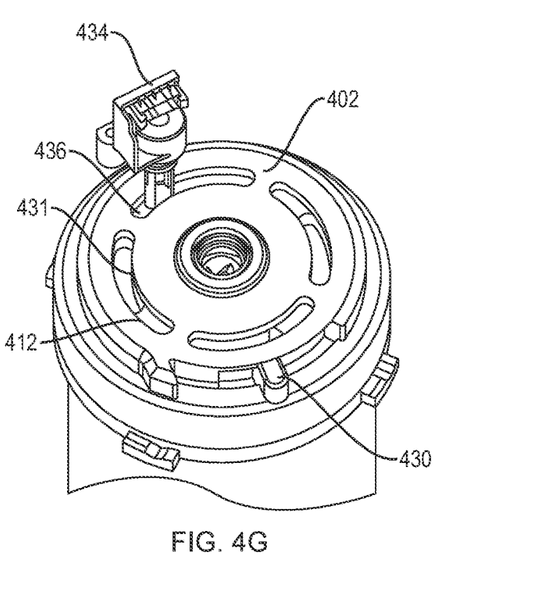
Figure 4H:
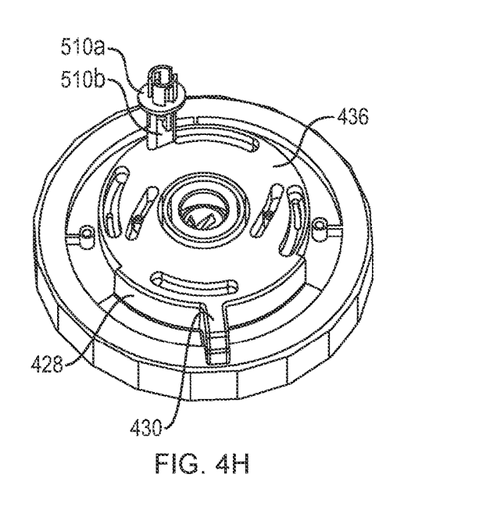

FIGS. 4F-H illustrate the positioning of the blade detection plunger 510 when the blade 300 is installed within the lid 400 according to some embodiments. As described above with regard to FIGS. 4D and 4E, to install the blade 300 in the lid 400, the user may first rotate the release lever arm 430 to force the retaining components 408 apart so that the blade 300 may be installed to the lid 400. Rotating the release lever arm 430 may also rotate the cam member 428 relative to the slotted member 402 of the lid 400 such that the second portion 510b of the blade detection plunger 510 may be forced to exit the pocket 432 and instead may contact an upper shelf 436 of the cam member 428. This positioning of the blade detection plunger 510 may cause the first portion 510a of the blade detection plunger 510 to activate the microswitch 434 to alert the user via the interface 142 that the blade 300 has been installed in the lid 400.

Figure 5A:
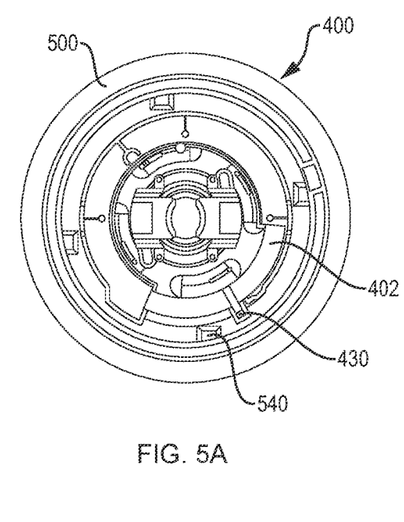
FIGS. 5A-D illustrate further configurations of the lid and the bowl when the blade is not installed in the lid according to some embodiments.
Figure 5B:
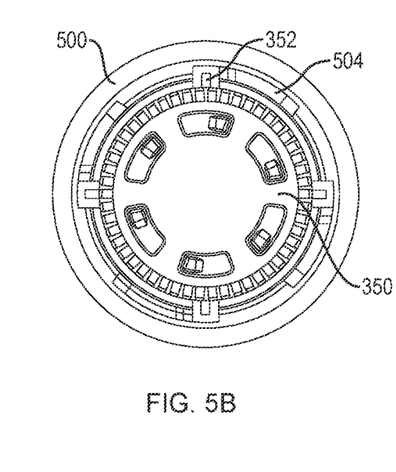
Figure 5C:
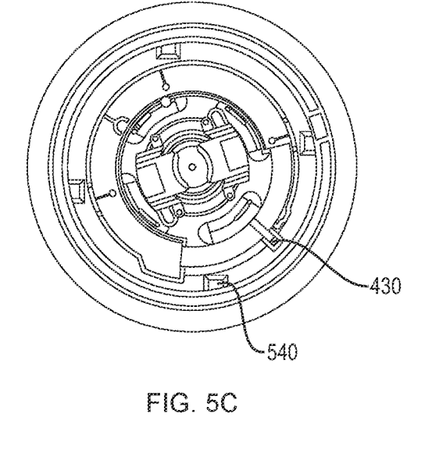
Figure 5D:
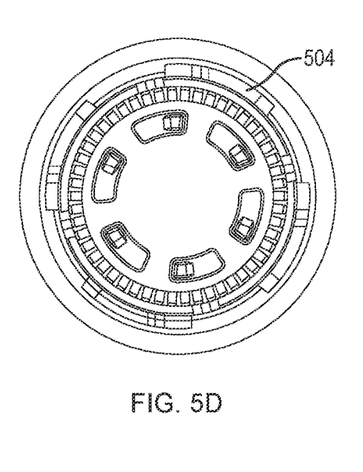

FIGS. 5A-D illustrate further configurations of the lid 400 and the bowl 350 when the blade 300 is not installed in the lid 400, according to some embodiments. FIGS. 5A and 5C illustrate a top-down views of the lid 400 (with certain components removed for ease of illustration) while FIGS. 5B and 5D illustrate bottom-up views of the bowl 350. Furthermore, FIGS. 5A and 5B illustrate and lid 400 and the bowl 350 in the unlocked position relative to the coupling 500, while FIGS. 5C and 5D illustrate the lid 400 and the bowl 350 in the locked position. As shown in FIG. 5A, when the blade 300 is not installed in the lid 400, if the user attempts to install the lid 400 and the bowl 350 to the coupling 500, the release lever arm 430 may sit counterclockwise of a rib 540 on the coupling 500. This may be true whether the lid 400 and the bowl 350 are in the unlocked position relative to the coupling 500, as shown in FIG. 5B (i.e., the projection 352 on the bowl 350 may not be inserted into the indentation 504 of the coupling 500), or in the locked position relative to the coupling 500, as shown in FIG. 5D (i.e., the projection 352 may be inserted into the indentation 504). This position of the release lever arm 430 prevents the retaining components 408 from opening.

Figure 6A:
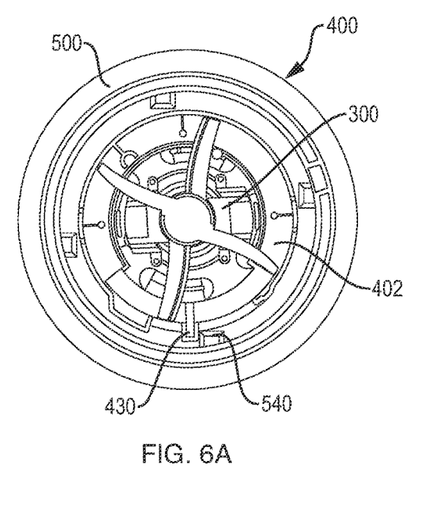
FIGS. 6A-D illustrate further configurations of the lid and the bowl when the blade is installed in the lid according to some embodiments.
Figure 6B:
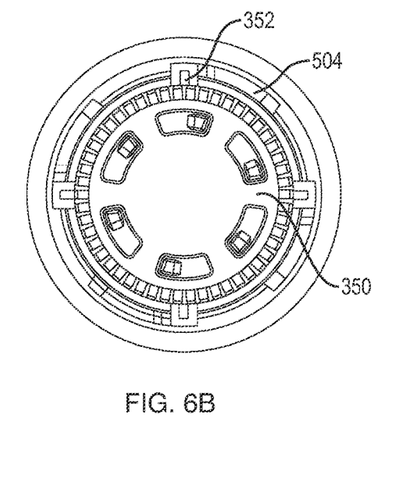
Figure 6C:
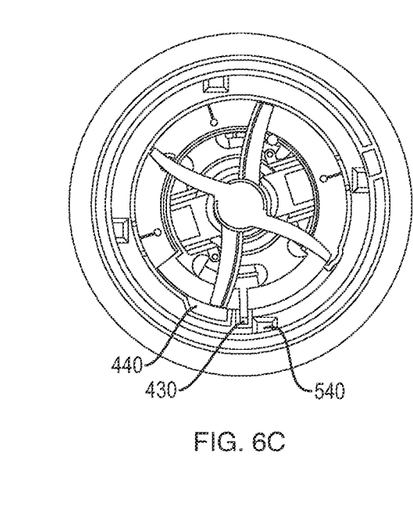
Figure 6D:
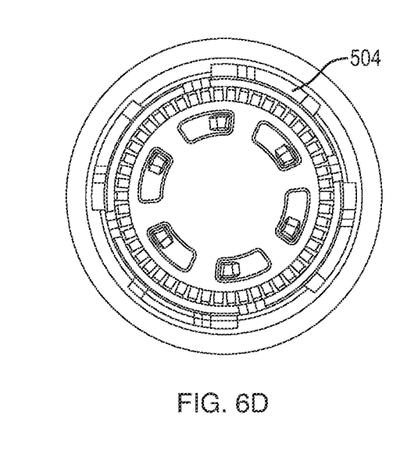

FIGS. 6A-D illustrate configurations of the lid 400 and the bowl 350 when the blade 300 is installed in the lid 400. FIGS. 6A and 6C illustrate a top-down view of the lid 400 (with certain components removed for ease of illustration) while FIGS. 6B and 6D illustrate a bottom-up view of the bowl 350. Furthermore, FIGS. 5A and 5B illustrate and lid 400 and the bowl 350 in the unlocked position relative to the coupling 500, while FIGS. 5C and 5D illustrate the lid 400 and the bowl 350 in the locked position. When the blade 300 is installed in the lid 400, if the user rotates the lid 400 and the bowl 350 to install them to the coupling 500, the release lever arm 430 may sit counterclockwise of the rib 540 of the coupling 500 and may contact the rib 540 during its rotation. As the user continues to rotate the bowl 350 and the lid 400, the release lever arm 430 may further rotates until it is forced to halt against the rib 540. The slotted member 402 may continue to rotate with the bowl 350 relative to the halted cam member 428 until the projection 440 on the slotted member 402 is halted by the release lever arm 430. This position of the release lever arm 430 may allow the retaining components 408 to open such that the blade 300 (now attached to a mixing shaft 252) can engage the ingredients in the bowl 350.

Figure 7A:
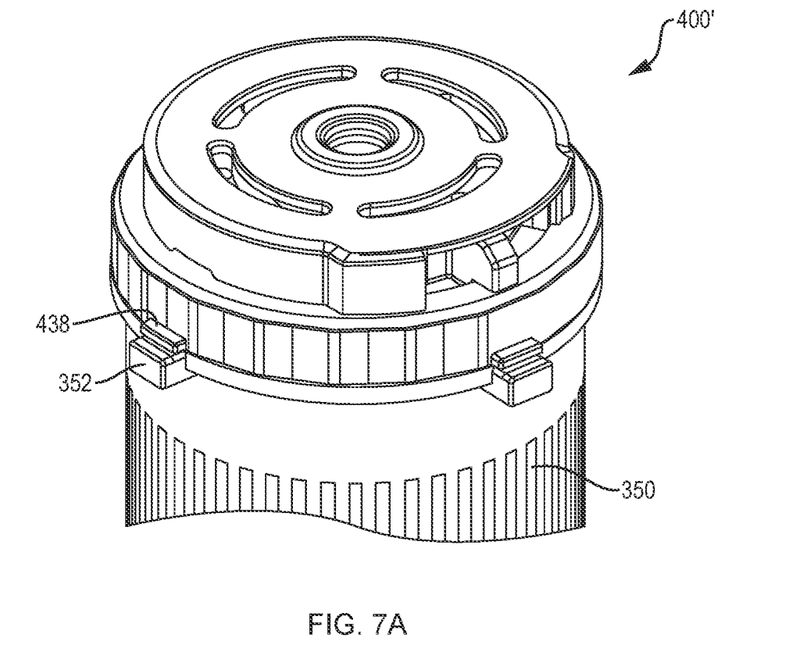
FIGS. 7A-C illustrate an alternative version of the lid according to some embodiments.
Figure 7B:
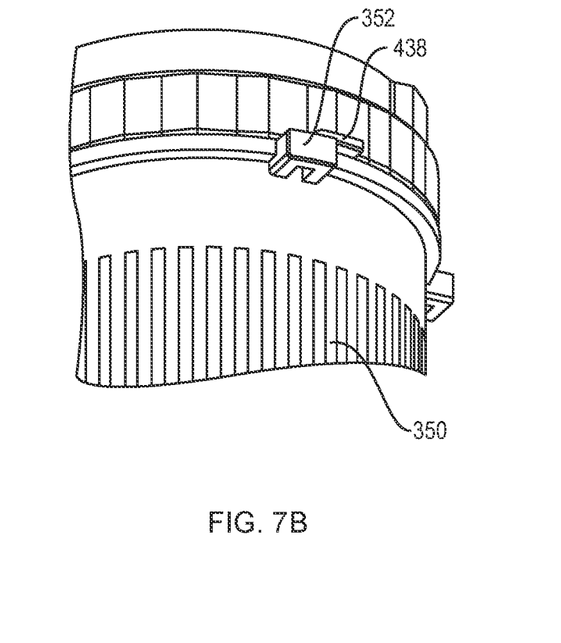
Figure 7C:
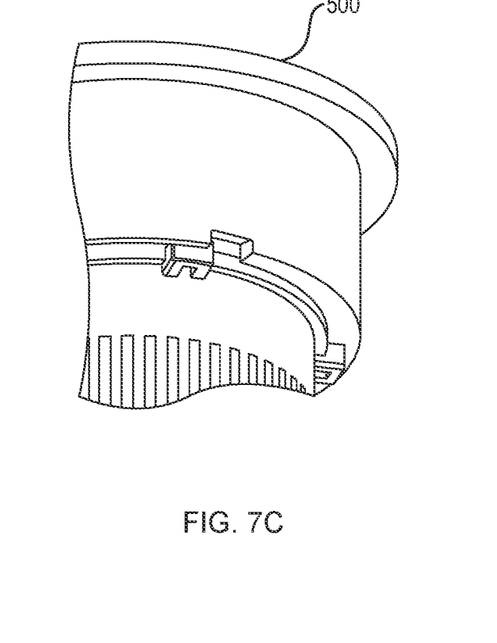

FIGS. 7A-C illustrate an alternative embodiment of the lid 400'. As shown in FIGS. 7A-C, in embodiments, the lid 400' may include a plurality of tabs 438 for aligning to the projections 352 on the bowl 350 when the lid 400' is properly installed on the bowl 350 (FIG. 7A). When the tabs 438 are not aligned with the projections 352 (FIG. 7B), the lid 400' and the bowl 350 cannot be installed to the coupling 500 (FIG. 7C). This mechanism advantageously prevents the user from assembling the bowl 350 to the micro puree machine 10 unless the lid 400' is fully screwed onto the bowl 350.

While the disclosure particularly shows and describes preferred embodiments, those skilled in the art will understand that various changes in form and details may exist without departing from the spirit and scope of the present application as defined by the appended claims. The scope of this present application intends to cover such variations. As such, the foregoing description of embodiments of the present application does not intend to limit the full scope conveyed by the appended claims.

We claim:

1. A lid and blade assembly for a micro puree machine, the lid and blade assembly comprising:
   a lid comprising:
   a slotted member defining one or more slots;
   a cam member positioned between the slotted member and an attachment portion, the cam member defining at least one pocket, the cam member being rotatable relative to the slotted member between a first position and a second position; and
   a plunger having a first portion and a second portion, the second portion of the plunger configured to extend through one of the one or more slots and rest in the at least one pocket when the cam member is in the first position; and
   a blade insertable within the lid;

wherein, when the cam member is in the second position, the second portion of the plunger is configured to exit the pocket to cause the first portion to activate a microswitch.

2. The lid and blade assembly of claim 1, wherein the second portion of the plunger rests on a surface of the cam member when the cam member is in the second position.

3. The lid and blade assembly of claim 1, wherein the attachment portion is configured to couple to a bowl.

4. The lid and blade assembly of claim 1, wherein activation of the microswitch indicates the presence of the blade within the lid to a user.

5. The lid and blade assembly of claim 1, wherein the cam member includes a lever arm for effecting manual rotation of the cam member between the first position and the second position.

6. The lid and blade assembly of claim 5, wherein the slotted member further comprises a projection for engaging the lever arm when the cam member is in the second position.

7. The lid and blade assembly of claim 1, wherein the lid further comprises at least one retaining component for engaging a portion of the blade when the blade is installed in the lid.

8. The lid and blade assembly of claim 1, wherein the lid is configured to couple to a coupling of the micro puree machine.

9. A micro puree machine including a lid and blade assembly and a bowl, the lid and blade-assembly comprising:
   a lid comprising:
      a slotted member defining one or more slots;
      an attachment portion configured to couple to the bowl;
      a cam member positioned between the slotted member and the attachment portion, the cam member defining at least one pocket, the cam member being rotatable relative to the slotted member between a first position and a second position; and
      a plunger having a first portion and a second portion, the second portion of the plunger configured to extend through one of the one or more slots and rest in the at least one pocket when the cam member is in the first position; and
   a blade insertable within the lid;
   wherein, when the cam member is in the second position, the second portion of the plunger is configured to exit the pocket to cause the first portion to activate a microswitch; and
   wherein the lid and the bowl are configured to couple to a coupling of the micro puree machine.

10. The micro puree machine of claim 9, wherein the second portion of the plunger rests on a surface of the cam member when the cam member is in the second position.

11. The micro puree machine of claim 9, wherein activation of the microswitch indicates the presence of the blade within the lid to a user.

12. The micro puree machine of claim 9, wherein the cam member includes a lever arm for effecting manual rotation of the cam member between the first position and the second position.

13. The micro puree machine of claim 12, wherein the slotted member further comprises a projection for engaging the lever arm when the cam member is in the second position.

14. The micro puree machine of claim 9, wherein the lid further comprises at least one retaining component for engaging a portion of the blade when the blade is installed in the lid.

15. The micro puree machine of claim 14, wherein the slotted member further defines at least one track for engaging at least one pin on the at least one retaining component.

16. The micro puree machine of claim 9, wherein the second portion of the plunger extends through an opening in the coupling.

17. The micro puree machine of claim 12, wherein the coupling comprises at least one rib for engaging the lever arm when the cam member is in the second position.

18. The micro puree machine of claim 9, wherein an outer surface of the bowl comprises at least one projection for engaging a corresponding indentation on an inner surface of the coupling.

19. The micro puree machine of claim 18, wherein the indentation houses an interlock plunger, and wherein engagement of the at least one projection with the interlock plunger causes the interlock plunger to activate the microswitch.

20. The micro puree machine of claim 19, wherein activation of the microswitch indicates installation of the bowl on the coupling to a user.

* * * * *